(12) United States Patent
Shirai et al.

(10) Patent No.: US 6,412,885 B1
(45) Date of Patent: Jul. 2, 2002

(54) BRAKE SYSTEM FOR VEHICLES

(75) Inventors: Kenji Shirai, Shizuoka-ken; Yasunori Yoshino, Aichi-ken; Akihiro Otomo, Aichi-ken; Hideyuki Inoue, Aichi-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/462,684

(22) PCT Filed: Jul. 6, 1998

(86) PCT No.: PCT/JP98/03027

§ 371 (c)(1),
(2), (4) Date: Jan. 10, 2000

(87) PCT Pub. No.: WO99/02384

PCT Pub. Date: Jan. 21, 1999

(30) Foreign Application Priority Data

Jul. 10, 1997 (JP) ............................................. 9-200906
Oct. 3, 1997 (JP) ............................................. 9-287779

(51) Int. Cl.[7] ................................................. B60T 8/88
(52) U.S. Cl. .................. 303/122.09; 303/140; 303/141; 303/146; 303/189
(58) Field of Search ....................... 303/122.03, 122.05, 303/122.09, 122.1, 140, 141, 142, 146, 189

(56) References Cited

U.S. PATENT DOCUMENTS

| | | | | |
|---|---|---|---|---|
| 5,125,483 A | * | 6/1992 | Kitagawa et al. | 303/20 |
| 5,671,982 A | * | 9/1997 | Wanke | 303/146 |
| 5,700,073 A | * | 12/1997 | Hiwatashi et al. | 303/146 |
| 5,809,444 A | * | 9/1998 | Hadeler et al. | 303/164 |
| 5,862,503 A | * | 1/1999 | Eckert et al. | 303/140 |
| 5,863,105 A | * | 1/1999 | Samp | 303/146 |
| 5,893,896 A | * | 4/1999 | Imamura et al. | 303/146 |
| 5,931,546 A | * | 8/1999 | Nakashima et al. | 303/146 |
| 6,155,655 A | * | 12/2000 | Matsumo | 303/146 |

FOREIGN PATENT DOCUMENTS

| | | | | |
|---|---|---|---|---|
| EP | 309697 | * | 8/1988 | 303/146 |
| EP | 486281 | * | 11/1991 | 303/146 |
| JP | 1-164659 | * | 6/1989 | 303/146 |
| JP | 3-32971 | * | 2/1991 | 303/146 |
| JP | 4-176764 | * | 6/1992 | 303/146 |
| JP | 4-362454 | * | 12/1992 | 303/146 |
| JP | 5-8709 | * | 1/1993 | 303/146 |
| JP | 6-321087 | * | 11/1994 | 303/146 |
| JP | 9-312903 | * | 9/1997 | 303/146 |
| WO | 99/02384 | * | 1/1999 | 303/146 |

* cited by examiner

*Primary Examiner*—Pam Rodriguez
*Assistant Examiner*—Devon Kramer
(74) *Attorney, Agent, or Firm*—Kenyon & Kenyon

(57) ABSTRACT

In order to prevent a needlessly excessive yaw moment from being applied to the vehicle, thereby improving the running stability of the vehicle when either one of the braking force generation units went wrong, a brake system for vehicles having electric brake units (14) each provided for each of the wheels to generate a braking force by its actuator (22) being driven according to the amount of depression of a brake pedal, and a controller (38) for controlling each of the electric brake units independently of others, is so constructed as to judge if any of the electric brake units went wrong (step 253, 259, 550, 650), and when either one of the electric brake units went wrong, to control the electric brake units other than the wrong unit according to the depression amount of the brake pedal so as to accomplish a best available stability of running of the vehicle.

10 Claims, 12 Drawing Sheets

BRAKE SYSTEM FOR VEHICLES

BACKGROUND OF THE INVENTION

1. Field of the Invention

The present invention relates to a brake system for vehicles such as automobiles, and more particularly, to a brake system for vehicles which comprises braking force generation means adapted to generate braking forces according to the amount of depression of a brake pedal.

2. Description of the Prior Art

The brake system for vehicles such as automobiles generally comprises braking force generation means provided for each of the wheels, each including a rotary member such as a brake rotor or a brake drum constructed to rotate together with a corresponding wheel and a movable member such as a brake pad or a brake shoe constructed to be driven according to the amount of depression (force or stroke of depression) of the brake pedal, so that each of the braking force generation means generates a braking force by a friction material of the movable member being pressed against the rotary member, so as thereby to brake the rotation of the corresponding wheel.

As one of those brake systems there is known an electric brake system in which the movable member of the braking force generation means is driven by an ultrasonic motor, wherein the ultrasonic motor provided for each of the wheels is controlled according to the amount of depression of the brake pedal, while the braking force generation means is constructed to dissolve a braking force generating condition when it went wrong in a condition of generating a braking force.

According to such an electric brake system of the prior application, since the ultrasonic motors are controlled separately for each of the wheels, the braking force of each of the wheels can be controlled independently of those of other wheels, and since the braking condition is dissolved even when the braking force generation means went wrong in a condition of generating a braking force, there can be avoided such a trouble that the running of the vehicle is interfered by a standing generation of a needless braking force due to a trouble of the brake system.

However, in the above-mentioned conventional electric brake system, although a fail-safe is cared for against a trouble of each of the braking force generation means each provided for each of the wheels, the stability of the behavior of the vehicle under a condition that the braking force generation means of a certain one of the wheels went wrong, i.e., the running stability of the vehicle as a whole, leaves a large room for further improvements.

In more detail, if the braking force generation means of either one of the wheels went wrong, there occurs a situation during a braking of the vehicle that, while the braking force of the wheel where the braking force generation means went wrong makes no change in spite of any change of the amount of depression of the brake pedal, the braking force of the wheel transversely opposite to the wheel where the braking force generation means went wrong changes according to the amount of depression of the brake pedal (an unbalanced braking condition), whereby a needless yaw moment is applied to the vehicle, deteriorating the running stability of the vehicle. Such a problem is latent not only in the electric brake system but also in various types of brake systems by which the braking of each of the wheels is controllable independently of those of the other wheels by each braking force generation means provided exclusively for each corresponding wheel.

Particularly when the braking force generation means went wrong to generate no braking force, a needless yaw moment is applied to the vehicle according to the depression of the brake pedal by a driver, rendering the vehicle to be liable to a deterioration of behavior, while on the other hand, if the braking force generation means went wrong to hold a braking force, the vehicle is subjected to a fluctuating yaw moment according to a depression of the brake pedal by the driver, thereby causing not only a deterioration of the running behavior of the vehicle but also causing a useless consumption of the kinetic energy generated by the engine for driving the vehicle. The adverse effect of a trouble occurred in the braking force generation means on a deterioration of the behavior of the vehicle is generally more noticeable when the engine is generating a higher level of kinetic energy, i.e. the vehicle speed, and therefore the momentum of the vehicle, is higher.

SUMMARY OF THE INVENTION

The present invention was made in view of the above-mentioned problems in conventional brake systems such as the electric brake system which are capable of controlling the braking force of each of the wheels independently of those of other wheels. A primary object of the present invention is to improve the running stability of vehicles than ever, by preventing a needless too large yaw moment from being applied to the vehicle when the braking force generation means of either one of the wheels went wrong, so as thereby to decrease or eliminate any adverse effect being applied to the vehicle due to the trouble of the braking force generation means.

According to the present invention, the above-mentioned primary object is accomplished by a brake system for vehicles, comprising braking force generation means each provided for each of wheels to generate a braking force according to an amount of depression of a brake pedal, and control means for controlling each of the braking force generation means for each of the wheels independently of the other braking force generation means for the other wheels, wherein when either one of the braking force generation means went wrong, the control means controls other normal one or ones of the braking force generation means, so as substantially not to apply any needless yaw moment to the vehicle.

According to the above-mentioned construction, when either one of the braking force generation means went wrong, the control means controls other normal one of ones of the braking force generation means so as substantially not to apply any needless yaw moment to the vehicle, whereby it is definitely prevented that there occurs such a situation that the vehicle is applied with a needless excessive yaw moment during a running thereof.

Alternatively, according to the present invention, the above-mentioned object is accomplished by a brake system for vehicles, comprising braking force generation means each provided for each of wheels to generate a braking force according to an amount of depression of a brake pedal, and a control means for controlling each of the braking force generation means for each of the wheels independently of the other braking force generation means for the other wheels, wherein the vehicle has an engine for generating a kinetic energy for the vehicle to run, and when either one of the braking force generation means went wrong, the control means restricts the generation of the kinetic energy by the engine.

According to the above-mentioned construction, when either one of the braking force generation means went wrong, the generation of the kinetic energy by the engine is restricted, whereby it is suppressed that the speed and the kinetic energy of the vehicle rise high, so that thereby an adverse influence of a needless yaw moment being applied to the vehicle due to a malfunction of the braking force generation means on a stable running of the vehicle is decreased.

In the above-mentioned construction, when either one of the braking force generation means went wrong to generate substantially no braking force, the control means may forbid one of the braking force generation means positioned transversely opposite to the wrong braking force generation means to operate, so as to prevent a needless yaw moment from being applied to the vehicle. According to such a construction, it is definitely avoided that there occurs an unbalance braking condition such that the wrong braking force generation means generates no braking force during a braking of the vehicle, while the braking force of one of the braking force generation means positioned transversely opposite to the wrong braking force generation means changes according to the amount of depression of the brake pedal, so as thereby to apply a needless yaw moment to the vehicle.

In the above-mentioned construction, when either one of the braking force generation means went wrong not to substantially release a generated braking force, the control means may operate one of the braking force generation means positioned transversely opposite to the wrong braking force generation means to generate a braking force, so as to prevent a needless yaw moment from being applied to the vehicle.

In the above-mentioned construction, when either one of the braking force generation means went wrong not to substantially release a generated braking force, the control means may operate one of the braking force generation means positioned transversely opposite to the wrong braking force generation means to generate a braking force, so as to prevent a needless yaw moment from being applied to the vehicle. According to such a construction, it is definitely prevented that the behavior of the vehicle is abruptly deteriorated.

In the above-mentioned construction, the control means may comprise means for calculating a target yaw moment for the vehicle according to a running condition of the vehicle, and when either one of the braking force generation means went wrong, the control means may control other normal one or ones of the braking force generation means, so that the yaw moment of the vehicle substantially coincides with the target yaw moment. According to such a construction, it is possible to protect the behavior of the vehicle from being deteriorated by a malfunction of one of the braking force generation means, while ensuring a good turning performance of the vehicle.

In the above-mentioned construction, when either one of the braking force generation means went wrong to generate substantially no braking force, the control means may control other normal ones of the braking force generation means, so that the braking force generated by one of the braking force generation means positioned longitudinally opposite to the wrong braking force generation means substantially coincides with the sum of the braking forces generated by front and rear ones of the braking force generation means positioned on a side transversely opposite to a side of the wrong braking force generation means. According to such a construction, it is definitely prevented that there occurs such a situation that there is generated a large difference between the sum of the braking forces generated by front and rear ones of the braking force generation means positioned on one side of the vehicle and the sum of the braking forces generated by front and rear ones of the braking force generation means positioned on the other side of the vehicle according to an amount of depression of the brake pedal.

In the above-mentioned construction, the vehicle may have an engine for generating a kinetic energy for the vehicle to run, and when either one of the braking force generation means went wrong not to substantially release a generated braking force, the control means may operate one of the braking force generation means positioned transversely opposite to the wrong braking force generation means to generate a braking force, so as to prevent a needless yaw moment from being applied to the vehicle, while the control means may restrict the generation of the kinetic energy by the engine. According to such a construction, an adverse influence of the malfunction of the braking force generation means on the behavior of the vehicle is decreased, whereby a deterioration of the behavior of the vehicle is effectively prevented as compared with a case where the generation of the kinetic energy by the engine is not restricted, while it is made possible to save such a kinetic energy that would be generated by the engine but uselessly consumed by the braking.

In the above-mentioned construction, the braking force generation means may constructed as an electric braking force generation means using an electric motor as an actuator.

In the above-mentioned construction, it may be judged if there is any allowance for increase in the braking force available by one of the braking force generation means positioned longitudinally opposite to the wrong braking force generation means, and when there is no allowance in the available braking force, the target braking force for one of the braking force generation means positioned longitudinally opposite to the wrong braking force generation means may be set to the available braking force, so that the target braking forces for other wheels are set according to the available braking force.

In the above-mentioned construction, when either one of the braking force generation means went wrong not to substantially release a generated braking force, when the vehicle is running straight forward, the target braking force of one of the braking force generation means positioned transversely opposite to the wrong braking force generation means may be set to be substantially equal to the braking force generated by the wrong generation means, while when the vehicle is substantially turning, the target braking force of one of the braking force generation means positioned diagonally opposite to the wrong braking force generation means may be set to be substantially equal to the braking force generated by the wrong braking force generation means.

In the above-mentioned construction, the control means may be constructed to calculate the target braking force of one of the braking force generation means positioned longitudinally opposite to the wrong braking force generation means according to an amount of depression of the braking pedal, and to calculate the target braking forces of front and rear ones of the braking force generation means on a side transversely opposite to the side of the wrong braking force generation means so that the sum thereof is substantially equal to the target braking force of the above-mentioned one braking force generation means, so as thereby to control the braking forces of all of the braking force generation means, except the wrong braking force generation means, to correspond to the target braking forces respectively corresponding thereto.

In the above-mentioned construction, the target braking forces of the above-mentioned front and rear ones of the braking force generation means may be calculated so that the target value for the front braking force generation means is greater than that for the rear braking force generation means.

In the above-mentioned construction, the vehicle may have an engine for generating a kinetic energy for the vehicle to run, and when either second one of the braking force generation means went wrong with either first one of the braking force generation means having gone wrong, the control means may decrease the generation of the kinetic energy by the engine.

In the above-mentioned construction, when either two front ones or two rear ones of the braking force generation means went wrong, the control means may restrict the generation of the kinetic energy by the engine, while when either front and rear right ones of the braking force generation means or front and rear left ones of the braking force generation means went wrong, the control means may gradually decrease the generation of the kinetic energy by the engine.

DESCRIPTION OF THE PREFERRED EMBODIMENTS

In the following, the present invention will be described in more detail with respect to several preferred embodiments by referring to the accompanying drawings.

Figure 1:
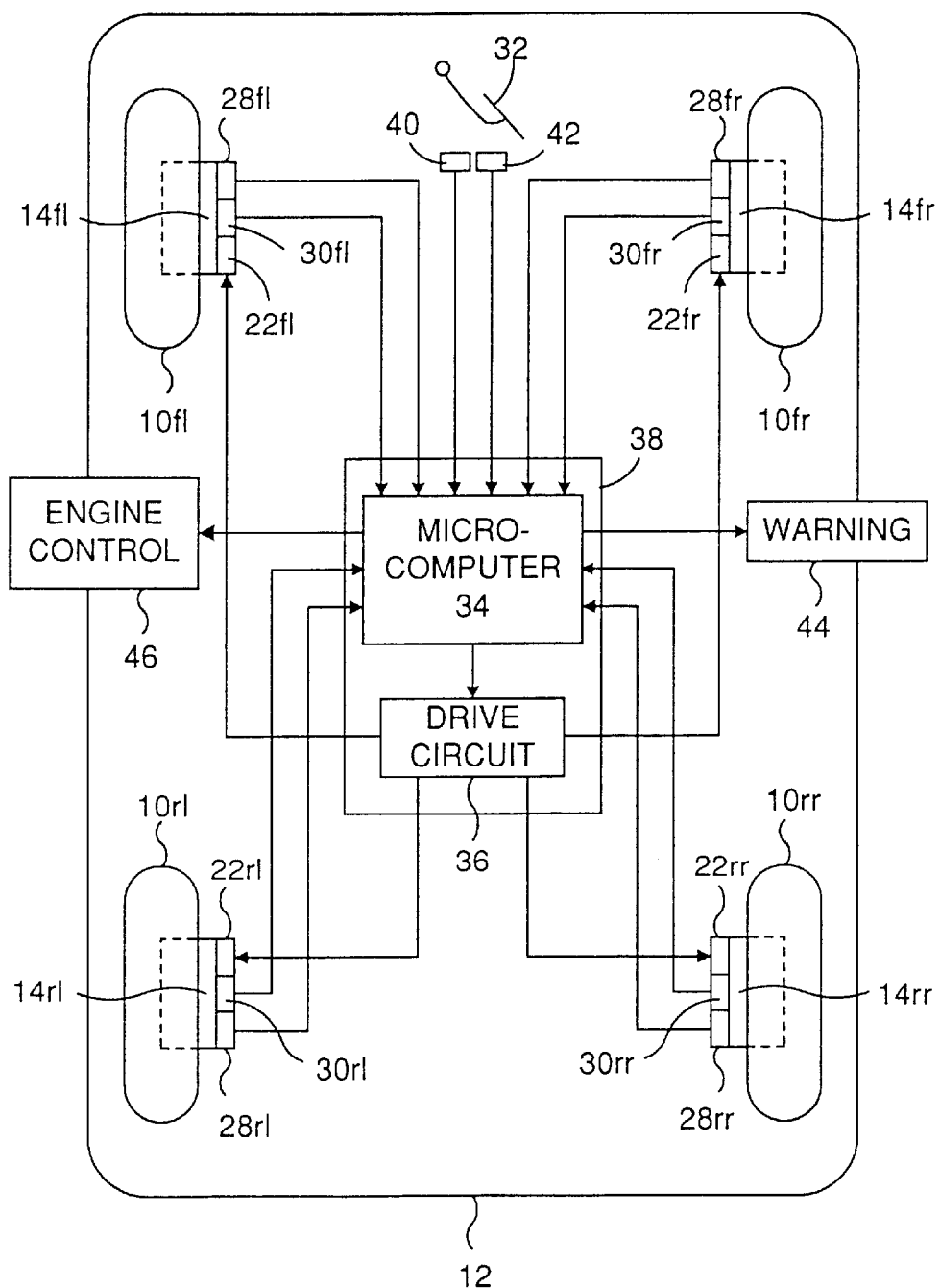
FIG. 1 is a diagrammatic view showing a first embodiment of the brake system for vehicles according to the present invention constructed as an electric brake system.
Figure 2:
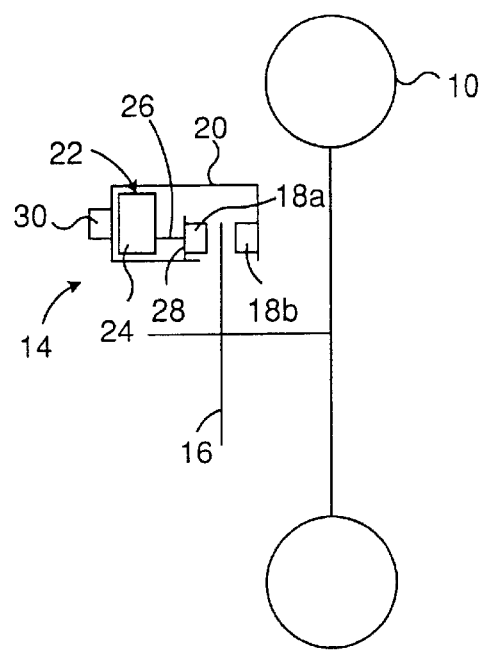
FIG. 2 is an enlarged general diagrammatic sectional view showing an essential part of the electric brake system.

FIG. 1 is a diagrammatic view showing a first embodiment of the brake system for vehicles according to the present invention constructed as an electric brake system, and FIG. 2 is an enlarged general diagrammatic view showing an essential portion of the braking force generation means.

In FIG. 1, 10fl and 10fr indicate front left and front right wheels of a vehicle 12, respectively, and 10rl and 10rr indicate rear left and rear right wheels of the vehicle, respectively. These wheels are provided with electric braking force generation means 14fl, 14fr, 14rl and 14rr, respectively. As shown in FIG. 2, each braking force generation means 14 comprises a rotor disk 16, brake pads 18a and 18b disposed on opposite sides of the disk rotor, a caliper body 20 supporting the brake pads, and an actuator 22 for driving the brake pads.

In the shown embodiment, the actuator 22 comprises an ultrasonic motor 24, and a movement conversion mechanism 26 not shown in detail in the figure for converting a rotary movement of a shaft of the ultrasonic motor to a reciprocating movement of a piston connected with the brake pad 18a, so that the brake pads 18a and 18b are driven toward one another to be frictionally engaged with the disk rotor 16 for generating a braking frictional force for the wheel 10. It is desirable that each braking force generation means 14 is so constructed as to release the braking condition when it went wrong while it was generating a braking force.

28 indicates a load sensor incorporated between the piston of the movement conversion mechanism 26 and the brake pad 18a for detecting a pressing force Fp by the brake pad, or a quantity of state corresponding to the braking frictional force generated between the disk rotor 16 and the brake pad 18a and 18b. An encoder 30 is provided at a position close to the ultrasonic motor 24 for detecting the rotational position of the ultrasonic motor.

The braking force generation means 14fl, 14fr, 14rl and 14rr are controlled by an electric control means 38 including a microcomputer 34 and a drive circuit 36 according to depression amount Ab of a brake pedal 32 operated by a driver. Although not shown in detail in the figure, the microcomputer may be of a common construction such as, for example, one including CPU, ROM, RAM and input and output port means, interconnected with one another by a bi-lateral common bus.

The microcomputer 34 is supplied with a signal indicating the depression amount Ab of the brake pedal from a pedal depression sensor 40, signals indicating pressing forces Fpi (i=fl, fr, rl and rr) by the brake pads in the braking force generation means corresponding to each of the load sensors 28fl–28rr, signals indicating the rotational positions of the respective ultrasonic motors 24 from the encoders 30fl–30rr, and a signal indicating if a brake lamp switch (BKSW) 42 adapted to be closed by a depression of the brake pedal is put on or not. Although not shown in FIG. 1, A/D converters are provided between the pedal depression sensor 40 and each of the load sensors 28fl–28rr, though not shown in the figure.

As described later, in normal operation the electric control means 38 controls the actuators 22fl–22rr of the respective wheels according to the depression amount Ab of the brake pedal, so as to control the pressing forces Fbi by the brake pads corresponding to the depression amount Ab. The electric control means 38 judges if each of the braking force generation means went wrong, and when either one of the braking force generation means went wrong, it actuates warning means 44, and dispatches a control signal to engine control means 46 when required, and further forbids the braking force generation means on a side transversely opposite to the side of the wrong braking force generation means to operate, so as thereby to prevent an unbalanced braking.

Figure 3:
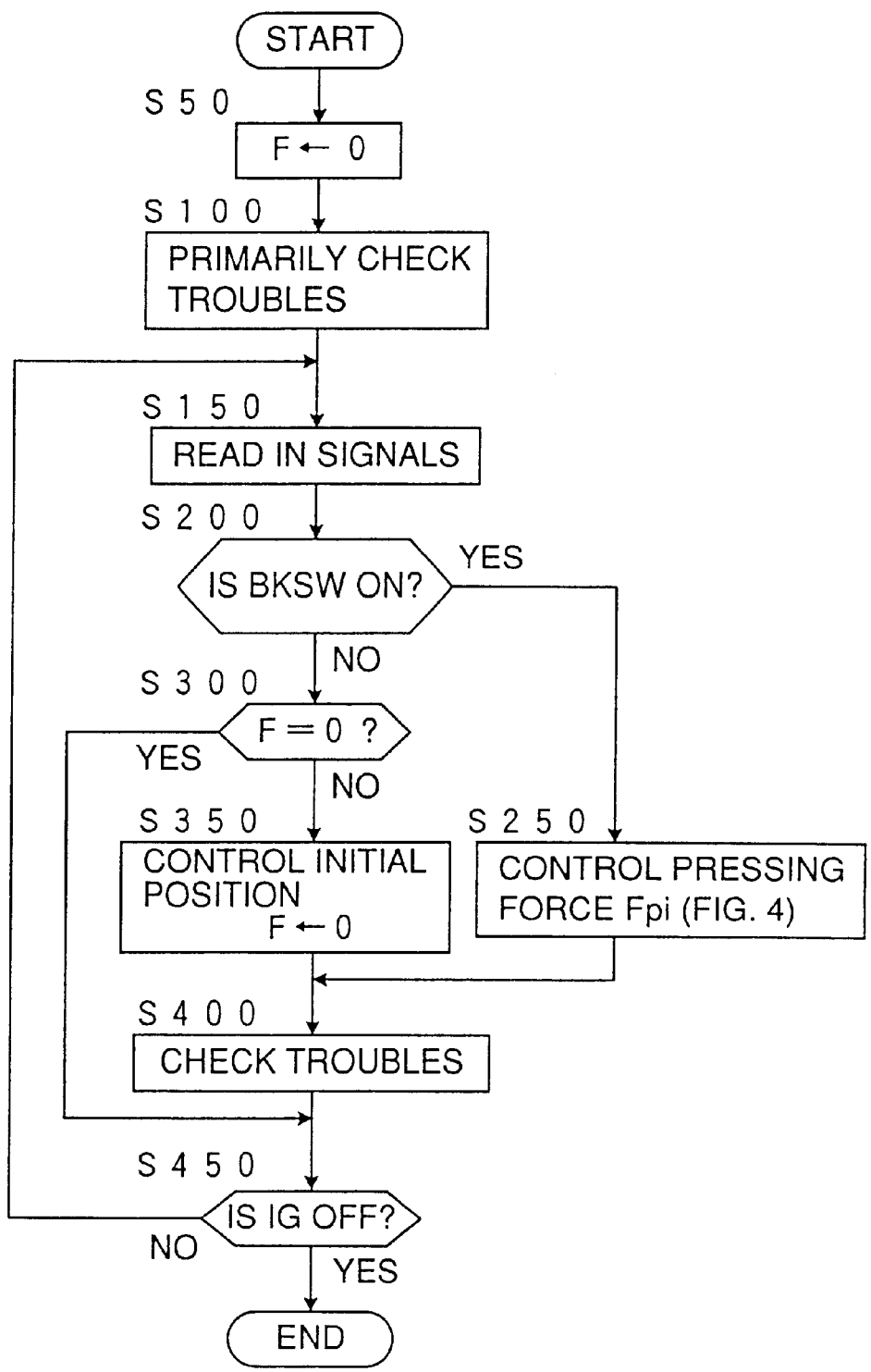
FIG. 3 is a flowchart showing a main routine of the braking force control in the first embodiment.

In the following, by referring to the flowchart of FIG. 3, the main routine of the braking force control according to a first embodiment will be described. The control according to the flowchart of FIG. 3 is started by a closure of an ignition switch not shown in the figure, and is repetitively executed at a predetermined time interval. Flag F concerns if the brake pads are positioned at their initial position, indicating by being "0" that the brake pads are positioned at their initial position.

First in step 50, the flag F is reset to 0, and then in step 100, a primary trouble check is executed with respect to the braking force generation means 14$fl$–14$rr$ of the respective wheels. The primary trouble check may be executed in such a manner that, for example, each braking force generation means is operated according to a predetermined pressing force application pattern, during which it is judged if the pressing forces Fpi changes according to the predetermined pressing force application pattern.

Figure 4:
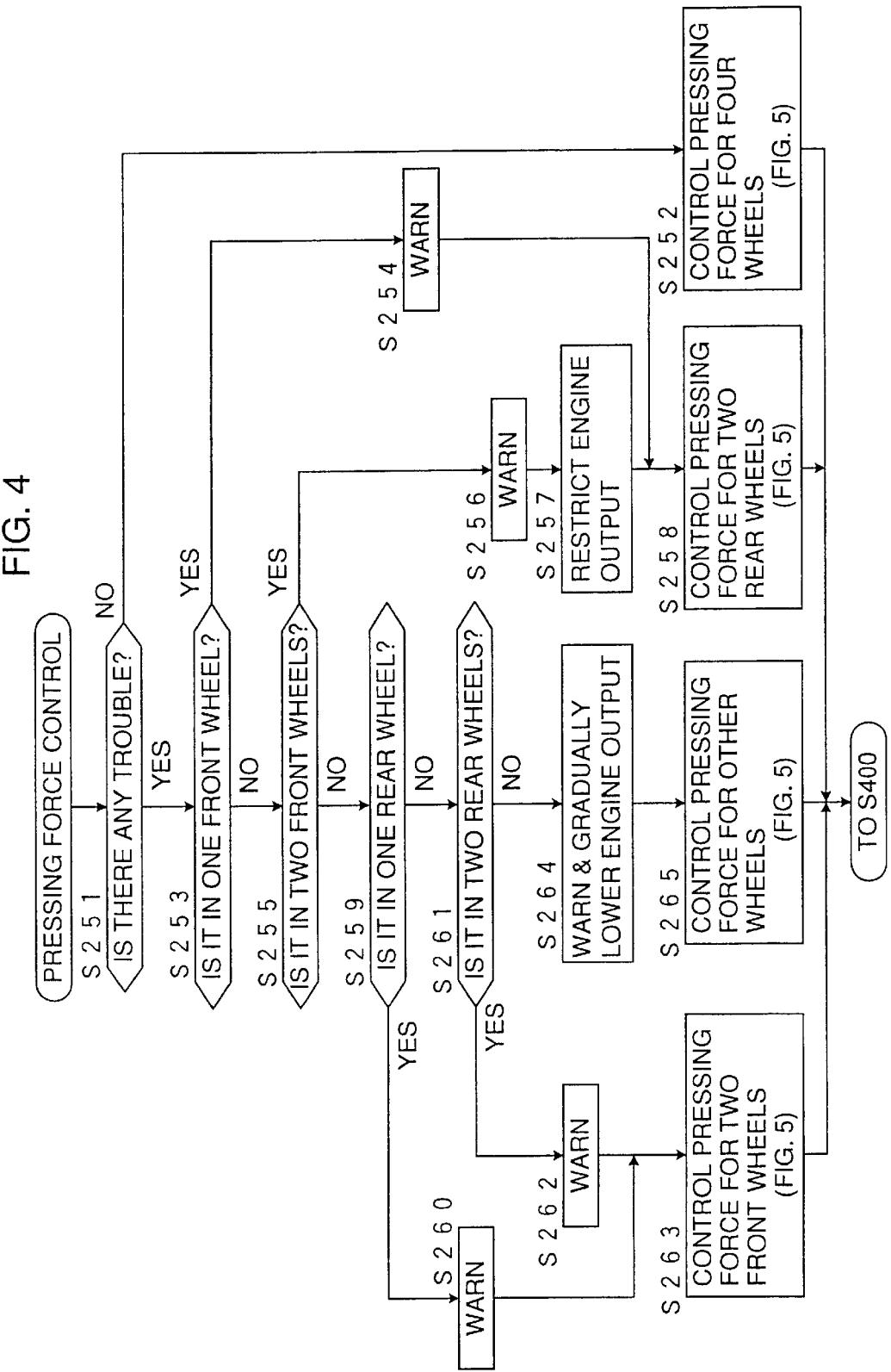
FIG. 4 is a flowchart showing a sub-routine of the pressing force control in the first embodiment.

In step 150, signals are read in, and then in step 200 it is checked if the brake lamp switch 42 is being put on, and when the answer of judgement is no, the control proceeds to step 300, whereas when the answer of judgement is yes, the control proceeds to step 250, where the pressing force Fpi of the braking force generation means of the respective wheels are controlled according to the flowchart shown in FIG. 4.

In step 300, it is judged if the flag F is 0 or not, and when the answer is yes, the control proceeds to step 450, whereas when the answer is no, the control proceeds to step 350, where the initial positioning control is executed so as to position the brake pads 18$a$ and 18$b$ of the braking force generation means of the respective wheels to their initial position, with resetting of the flag F to 0.

In step 400, it is checked if any one of the braking force generation means went wrong by judging if the pressing force application control of step 250 or the initial positioning control of step 350 are duly executed according to the instructions. When the value of the braking force detected by the load sensors 28$fl$–28$rr$ change from the values of the corresponding braking force generation instructions in either one of the braking force generation means 14$fl$–14$rr$ beyond a predetermined threshold value, it is judged that the corresponding braking force generation means went wrong. In step 450, it is judged if the ignition switch was turned off, and when the answer is no, the control returns to step 150, whereas when the answer is yes, the control according to this routine is ended. In this connection, the control may be modified such that when the answer of judgement in step 300 is yes, the trouble check of step 400 is executed with a predetermined time interval.

Next, referring to the flowchart of FIG. 4, the sub-routine of the pressing force control in the first embodiment will be described.

Figure 5:
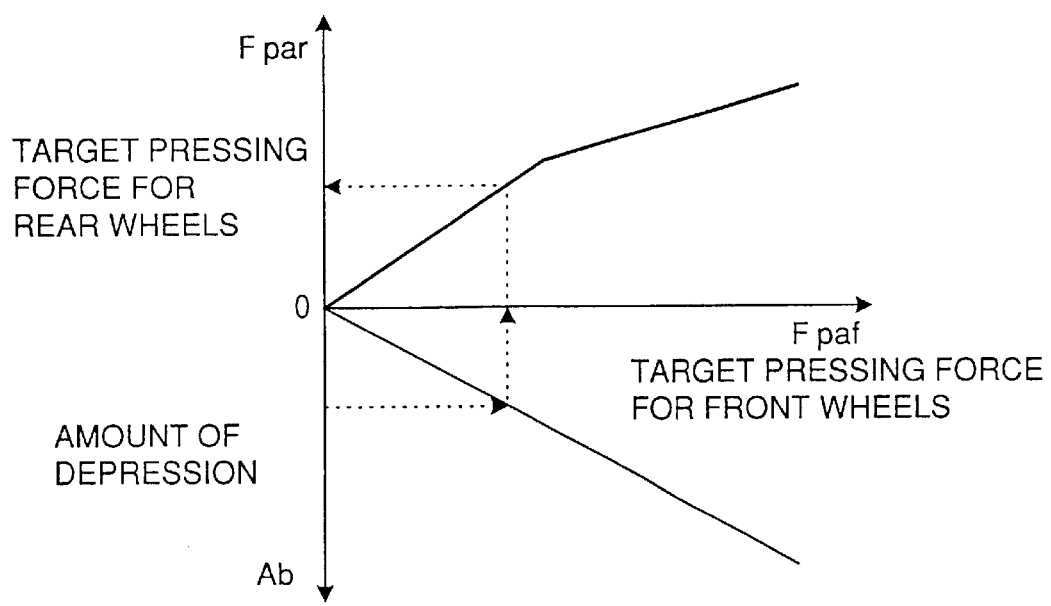
FIG. 5 is a graph showing the relationship between depression amount Ap of a brake pedal and target pressing forces Fpaf and Fpar.

In step 251, it is judged if any of the braking force generation means went wrong, and if the answer is yes, the control proceeds to step 253, whereas when the answer is no, the control proceeds to step 252, where target pressing forces Fpaf and Fpar for the braking force generation means of the front left and front right wheels and the rear left and rear right wheels are calculated according to depression amount Ab of the brake pedal by referring to a map such as shown in FIG. 5, and a pressing force of the respective braking force generation means are controlled to accomplish the respective target pressing forces.

In step 253, it is checked if the braking force generation means for one of the front left and front right wheels went wrong, and if the answer is yes, the control proceeds to step 254, where warning means 44 is put on to warn the driver of the occurrence of a trouble in the braking force generation means, and the control proceeds to step 258. When the answer of judgement in step 253 is no, the control proceeds to step 255, and it is judged if both of the braking force generation means of the front left and right wheels went wrong.

When the answer of judgement in step 255 is no, the control proceeds to step 259, whereas when the answer of judgment is yes, the control proceeds to step 256, where the warning means 44 is put on, and the control proceeds to step 257, where a control signal is dispatched to the engine control means 46 to restrict the output of the engine, and further in step 258 target pressing forces Fpar for the braking force generation means of the rear left and rear right wheels are calculated according to the depression amount Ab of the brake pedal by referring to a map such as shown in FIG. 5, so that the pressing force of those brake force generation means are controlled to become the respective target pressing forces.

In steps 259–263, the controls are opposite to the above with respect to the front and rear of the wheels, and similar controls of warning and controls of the pressing forces of the front left and front right wheels are executed in the same manner as in steps 254–258, except that the engine output restriction control in step 257 is not executed, whereas when the answer of step 261 is no, the control proceeds to step 264.

The engine output restriction control in step 257 is executed in order to lower a liability of the vehicle to spin due to a lowering of a lateral force in the rear of the vehicle during a braked turn, because in step 258 the braking force is generated only in the rear left and rear right wheels corresponding to the depression amount of the brake pedal. The restriction of the engine output may be executed also in step 262. In such a modification, it is desirable that the degree of restriction of the engine output in step 262 is set to be lower than that in step 257. Further, the engine output restriction in step 257 (and step 262) may be executed so as to limit the engine output not to exceed a predetermined value, or to decrease a ratio of the engine output to the depression amount of the brake pedal.

In step 264, the warning means 44 is put on to cyclically flash with dispatch of a warning sound, while the engine output is gradually lowered by a corresponding control signal supplied to the engine control means 46, and in step 265 target pressing forces of the braking force generation means of the wheels except the wrong braking force generation means are calculated according to the depression amount Ab of the brake pedal by referring to the map of FIG. 5, whereby those braking force generation means are controlled to generate pressing forces to attain the target pressing forces, thereby stopping the vehicle.

Thus, according to the first embodiment, when either one of the braking force generation means went wrong, the answer of judgement becomes yes in step 253 or 259, whereby steps 254 and 258 or steps 260 and 263 are executed, so that the operation of one of the braking force generation means positioned transversely opposite to the wrong braking force generation means is forbidden to operate, while braking force is generated at the two wheels longitudinally opposite to the wheel at which the braking force generation means went wrong corresponding to the amount of depression of the brake pedal, whereby a deterioration of the behavior of the vehicle due to an unbalanced braking is avoided, ensuring a running state close to the normal running state.

In this connection, even when the one braking force generation means goes wrong in a state of generating a braking force, since the braking force remains constant, not to change in relation to the changes of the amount of depression of the brake pedal, the difference between the left and right braking forces is constant, and therefore the yaw moment due to the difference of the braking forces does not fluctuate according to changes of the amount of depression of the brake pedal.

Further, according to the first embodiment, when the braking force generation means for both of the front left and front right wheels or the both of the rear left and rear right wheels went wrong, the answer of judgment in step 255 or 261 is yes, whereby steps 256–258 or steps 262 and 263 are executed, where it is possible to drive the vehicle to a place such as a repair factory, while preventing a deterioration of the vehicle behavior due to an unbalanced braking.

When the braking force generation means for both of the front left and rear left wheels or both of the front right and rear right wheels went wrong, the answer of judgement in step 261 becomes no, whereby steps 264 and 265 are executed, so as to gradually lower the engine output, so that the vehicle speed is gradually lowered, so as to be safely stopped.

Figure 6:
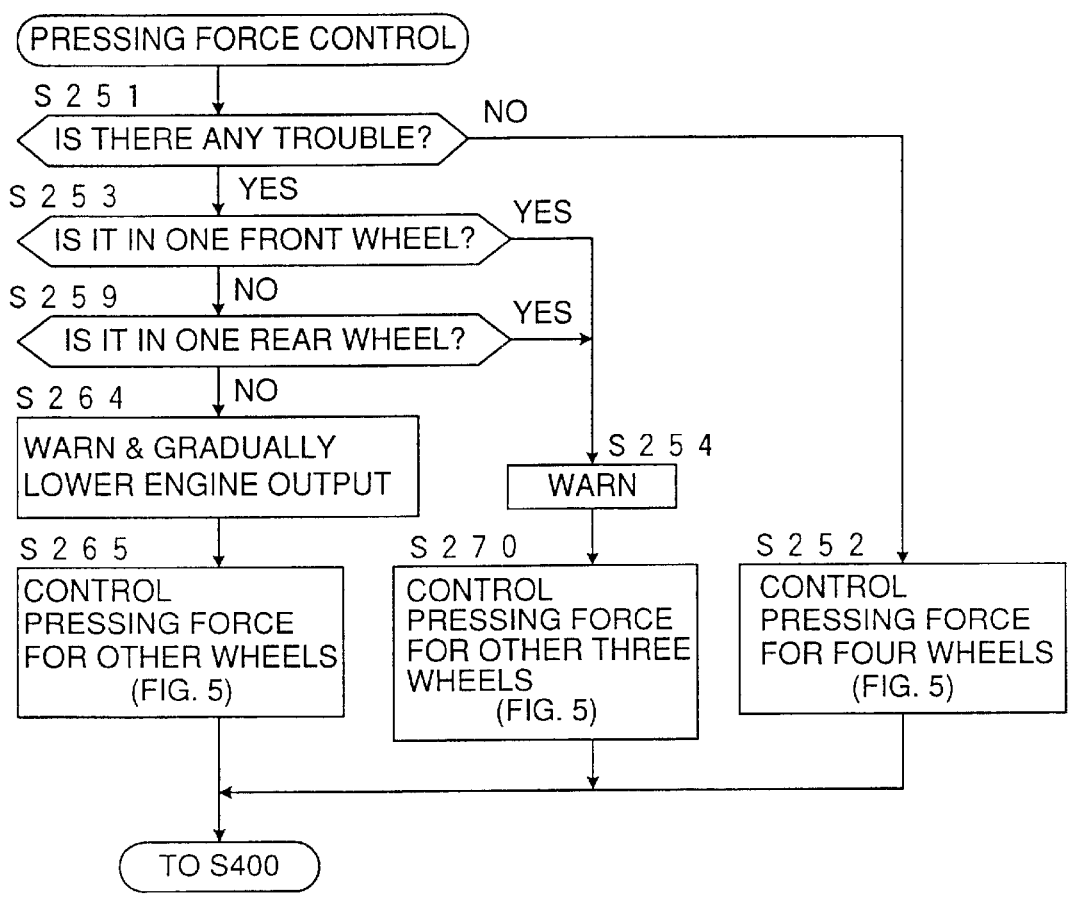
FIG. 6 is a flowchart showing a sub-routine of the pressing force control in the second embodiment of the brake system according to the present invention.
Figure 7:
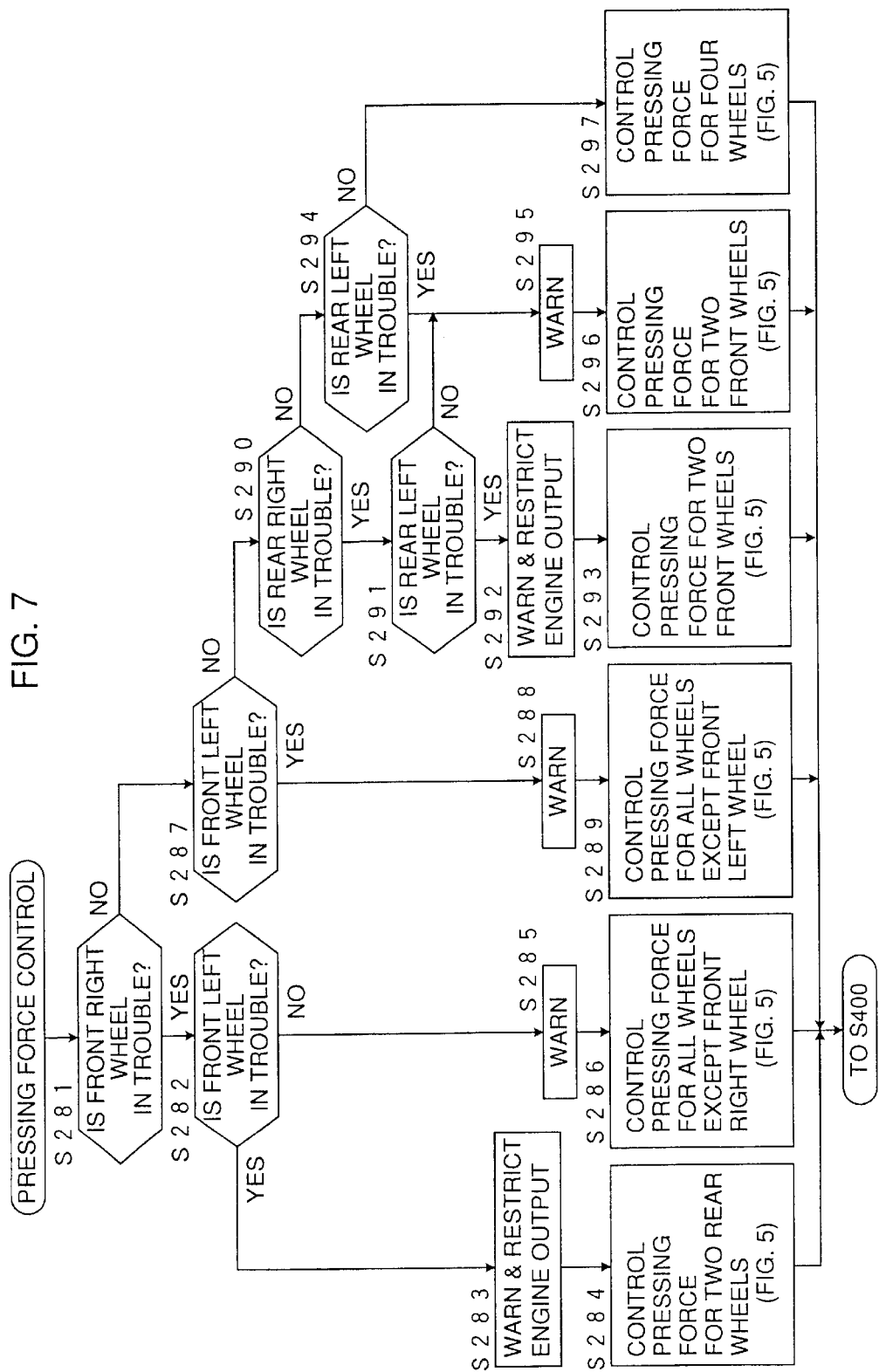
FIG. 7 is a flowchart showing a sub-routine of the pressing force control in the third embodiment of the brake system according to the present system.

FIGS. 6 and 7 are the flowcharts showing the sub-routines of the press plate control in the second and third embodiments of the brake system according to the present invention, respectively. In FIG. 6, the steps corresponding to those shown in FIG. 4 are designated by the same step numbers as in FIG. 4. Further, although not shown in the figure, the brake system and the electric braking force generation means of these embodiments are constructed in the same manner as those in the first embodiment, and the main routine of the braking force control is the same as in the first embodiment (FIG. 3).

In the second embodiment shown in FIG. 6, when it is judged in step 253 that the braking force generation means of one of the front left and front right wheels went wrong, or when it is judged in step 259 that the braking force generation means of one of the rear left and rear right wheels went wrong, it is warned in step 254, and in step 270 the braking force generation means of the three wheels other than the wrong braking force generation means are controlled.

In this case, when the braking force generation means of one of the front left and front right wheels went wrong, target pressing force Fpar for the rear wheel on the same side as the wheel at which the braking force generation means went wrong is calculated according to the depression amount Ab of the brake pedal by referring to the map of FIG. 5, and taking a positive constant C1 which is larger than 0 but smaller than 1, target pressing forces Fpaft and Fpart for the front and rear wheels on a side opposite to the side of the wheel at which the braking force generation means went wrong are calculated according to the below-mentioned equations 1 and 2, and the braking forces of those three wheels are controlled to become the respective target pressing forces.

$$Fpaft=Fpar(1+C1)/2 \quad (1)$$

$$Fpart=Fpar(1-C1)/2 \quad (2)$$

When the braking force generation means of one of the rear left and rear right wheels went wrong, target pressing force Fpaf for the front wheel on the same side as the wheel at which the braking force generation means went wrong is calculated according to the depression amount Ab of the brake pedal by referring to the map of FIG. 5, and by taking a positive constant C2 which is larger than 0 but smaller than 1, target pressing forces Fpaft and Fpart for the front and rear wheels on a side opposite to the side of the wheel at which the braking force generation means went wrong are calculated according to the below-mentioned equations 3 and 4, and then the pressing forces of the braking force generation means of those three wheels are controlled to become the respective target pressing forces.

$$Fpaft=Fpaf(1+C2)/2 \quad (3)$$

$$Fpart=Fpaf(1-C2)/2 \quad (4)$$

Further, in this embodiment, when the braking force generation means of two or more wheels went wrong, i.e. when the answer of judgement in step 259 is no, steps 264 and 265 are executed, so that the vehicle speed is gradually lowered, to safely stop the vehicle.

Thus, according to the second embodiment, when the braking force generation means of either one of the wheels went wrong to generate no braking force, braking forces of the three wheels other than the wheel at which braking force generation means went wrong are generated so that the sum of the braking forces generated at the front and rear right wheels and the sum of the braking forces generated at the front and rear left wheels according to the depression of the brake pedal are equal to one another, whereby a substantially normal running condition can be ensured, while avoiding a deterioration of the vehicle behavior due to an unbalanced braking, while ensuring a better braking performance as compared with the first embodiment in which the braking force is generated only at the two wheels longitudinally opposite to the wheel at which the braking force generation means went wrong.

Particularly according to this embodiment, when the braking force generation means of either one of the wheels went wrong, the target pressing forces of the front and rear wheels on a side opposite to the side of the wheel at which the braking force generation means went wrong are calculated according to the equations 1 and 2 or equations 3 and 4 so that the target pressing forces are set higher for the front wheels than for the rear wheels, whereby a liability to spin of the vehicle due to a lowering of side forces available at the rear wheels during a braked turn of the vehicle is decreased. The constants C1 and C2 in equations 1–4 may be set to 0, so that the target pressing forces for the front and rear wheels on a side opposite to the side of the wheel at which braking force generation means went wrong are set to be equal to one another.

Also in this embodiment, steps 255–258 and steps 261–263 of the first embodiment may be executed, so that when the braking force generation means of the front left and front right wheels or the rear left and rear right wheels went wrong, the vehicle can be driven to a repair factory.

In the third embodiment shown in FIG. 7, in step 281 it is judged if the braking force generation means 14fr of the front right wheel went wrong, and if the answer of judgement is no, the control proceeds to step 287, whereas if the answer of judgement is yes, the control proceeds to step 282.

In step 282, it is judged if the braking force generation means 14fl of the front left wheel went wrong, and if the answer of judgement is yes, the control proceeds to step 283, where the warning means 44 is put on to cyclically flash, while the output of the engine is restricted by a control signal being dispatched to the engine control means 46, and then in step 284 target pressing forces Fpar for the rear left and rear right wheels are calculated according to the depression amount Ab of the brake pedal by referring to the map of FIG. 5, so that the pressing forces of those braking force generation means are controlled to become to the target pressing forces.

In the same manner as in step 257 (and 262) in the first embodiment, it is desirable that the degree of restriction of the engine output in step 283 is set higher than that in step 292 described hereinbelow, so as to decrease a liability to spin during a turn running.

When the answer of judgement in step 282 is no, then in step 285 the warning means 44 is put on, and then in step 286 target pressing force Fpar for the rear wheel on the same side as the wheel at which the braking force generation means went wrong is calculated according to the depression amount Ab of the brake pedal by referring to the map of FIG. 5, and the target pressing forces Fpaft and Fpart for the front and rear wheels on a side opposite to the side of the wheel at which the braking force generation means went wrong are calculated according to the above-mentioned equations 1 and 2, whereby the pressing forces of the braking force generation means of those three wheels are controlled to become the respective target pressing forces.

In step 287, it is judged if the braking force generation means 14fl of the front left wheel went wrong, and if the answer of judgement is no, the control proceeds to step 290, whereas if the answer is yes, the control proceeds to step 288, where the warning means 44 is put on, and in step 289 target pressing force Fpar for the rear wheel on the same side as the wheel at which the braking force generation means went wrong is calculated according to the depression amount Ab of the brake pedal by referring to the map of FIG. 5, and target pressing forces Fpaft and Fpart for the front and rear wheels on a side opposite to the side of the wheel at which the braking force generation means went wrong are calculated according to equations 3 and 4, whereby the pressing force of the braking force generation means of those three wheels are controlled to become the respective target pressing forces.

In step 290, it is judged if the brake force generation means 14rr of the rear right wheel went wrong, and if the answer of judgement is no, the control proceeds to step 294, whereas if the answer of judgement is yes, the control proceeds to step 291.

In step 291, it is judge if the braking force generation means 14rl of the rear left wheel went wrong, and if the answer of judgement is no, the control proceeds to step 295, whereas if the answer of judgement is yes, the control proceeds to step 292, where the warning means 44 is put on to cyclically flash, and the output of the engine is restricted, and then in step 293 target pressing forces for the front left and front right wheels are calculated in the same manner as in step 284, so that the pressing forces of those braking force generation means are controlled to the respective target pressing forces.

In step 294, it is judged if the brake force generation means 14rl of the rear left wheel went wrong, and if the answer of judgement is yes, the control proceeds to step 295, whereas the warning means 44 is put on, and in step 296 the pressing forces at the front left and front right wheels are controlled to become the respective target pressing forces in the same manner as in step 293, whereas if the answer of judgement is no, the control proceeds to step 297, and target pressing forces for the four wheels are calculated according to the depression amount Ab of the brake pedal by referring to the map of FIG. 5, so that the pressing forces of the respective braking force generation means are controlled to become to the respective target pressing forces.

Thus, according to the third embodiment, when the braking force generation means of one of the rear left and rear right wheels went wrong, in steps 281 and 287 the answer of judgement is no, and then in step 290 or 294 the answer of judgement is yes, and then in step 293 or 296 the braking forces are generated at the front left and front right wheels according to the amount of depression of the brake pedal in the same manner as in the first embodiment, whereas when the braking force generation means of one of the front left and front right wheels went wrong, the answer of judgment in step 281 or 287 is yes, and then in step 286 or 289 the braking forces at the three wheels other than the wheel at which the braking force generation means went wrong are generated according to the amount of depression of the brake pedal in the same manner as in the second embodiment, so that the sum of the braking forces at the front and rear right wheels is equal to the sum of the braking forces at the front and rear left wheels.

Therefore, according to the third embodiment, the liability of the vehicle to spin during a braked turn with the braking force generation means of one of the rear left and rear right wheels gone wrong can be decreased than in the second embodiment, and the braking performance of the vehicle at a time when the braking force generation means of one of the front left and front right wheels gone wrong can be improved than in the first embodiment.

Figure 8:
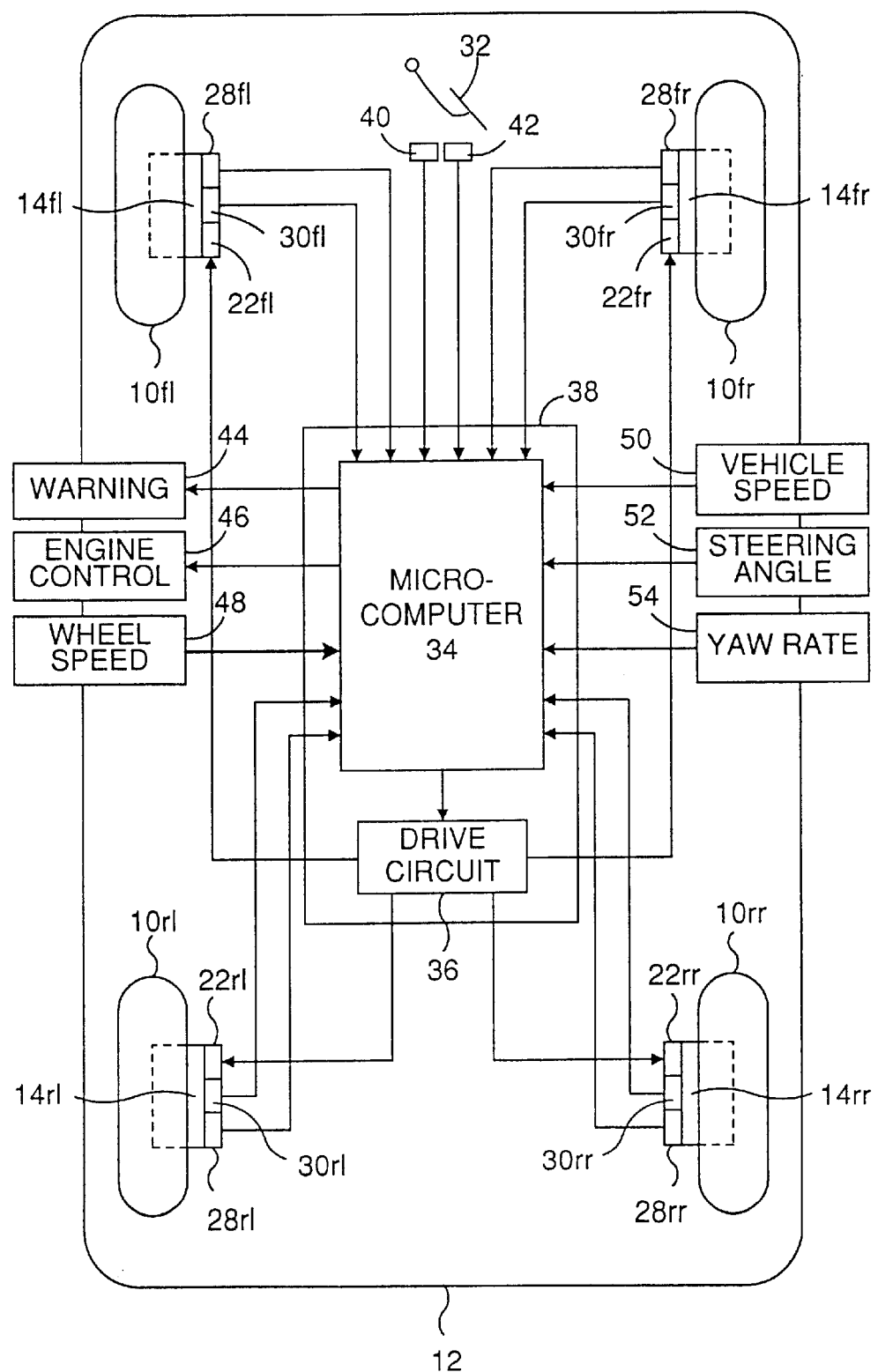
FIG. 8 is a diagrammatical view similar to FIG. 1, showing a fourth embodiment of the brake system for vehicles according to the present invention constructed as an electric brake system.

FIG. 8 is a diagrammatical view similar to FIG. 1, showing a fourth embodiment of the brake system for vehicles according to the present invention constructed as an electric brake system. In FIG. 8, the portions corresponding to those shown in FIG. 1 are designated by the same reference numerals as in FIG. 1.

The above-mentioned first through third embodiments are suited for the case that the braking force generation means go wrong to generate no braking force or for the type of braking force generation means which can dissolve a braking condition when it went wrong, while the fourth embodiment is also adaptable to the case that the braking force generation means went wrong not to release a braking force or to the braking force generation means which may go wrong not to release a braking force. When, for example, the driving source of the braking force generating means is an ultrasonic motor having a high torque retaining performance in the power off condition, or when the driving source of the braking force generation means incorporates a warm gear mechanism or the like in the driving power transmission driven by other types of motor so that the motor can not be driven in reverse from the output side, if a trouble such as a cut of the wire occurs in the power line when the braking force generating means is generating a braking force, it occurs that the braking condition is not dissolved.

In the fourth embodiment, the microcomputer 34 of the electric control means 38 is supplied with signals indicating wheel speeds Vwi (i=fl, fr, rl and rr) of the respective wheels from wheel speed sensors 48fl–48rr, a signal indicating vehicle speed V from a vehicle speed sensor 50, a signal indicating steering angle () from a steering angle sensor 52, and yaw rate γ of the vehicle from a yaw rate sensor 54, in addition to those signals supplied in the first embodiment. The steering angle o and the yaw rate γ are made positive when the vehicle is turning to the left.

In a normal operation, i.e. when none of the braking force generation means of the respective wheels went wrong, in the same manner as in the above-mentioned first through third embodiments, the actuators 22fl–22rr of the respective wheels are controlled according to the depression amount Ab of the brake pedal, so that the pressing force Fpi by the brake pads of the respective wheels are controlled according to the brake pedal depression amount Ab.

In contrast, when either one of the braking force generation means went wrong to generate no braking force, the electric control means 38 actuates the warning 44, and controls the braking forces at the other normal wheels so that the yaw rate γ of the vehicle becomes the target yaw rate γt determined according to the steering angle o and others, while lowering the output of the engine by dispatching a corresponding control signal to the engine control means 46.

On the other hand, when either one of the braking force generation means went wrong not to release a braking force, the electric control means 38 actuates the warning means 44, and lowers the engine output, while applying the same braking force as that by the wrong braking force generation means to a wheel positioned longitudinally or transversely opposite to the wheel at which the braking force generation means went wrong, so as thereby to prevent the vehicle from being subjected to an instable running condition such as a spin or a drift out.

Figure 9:
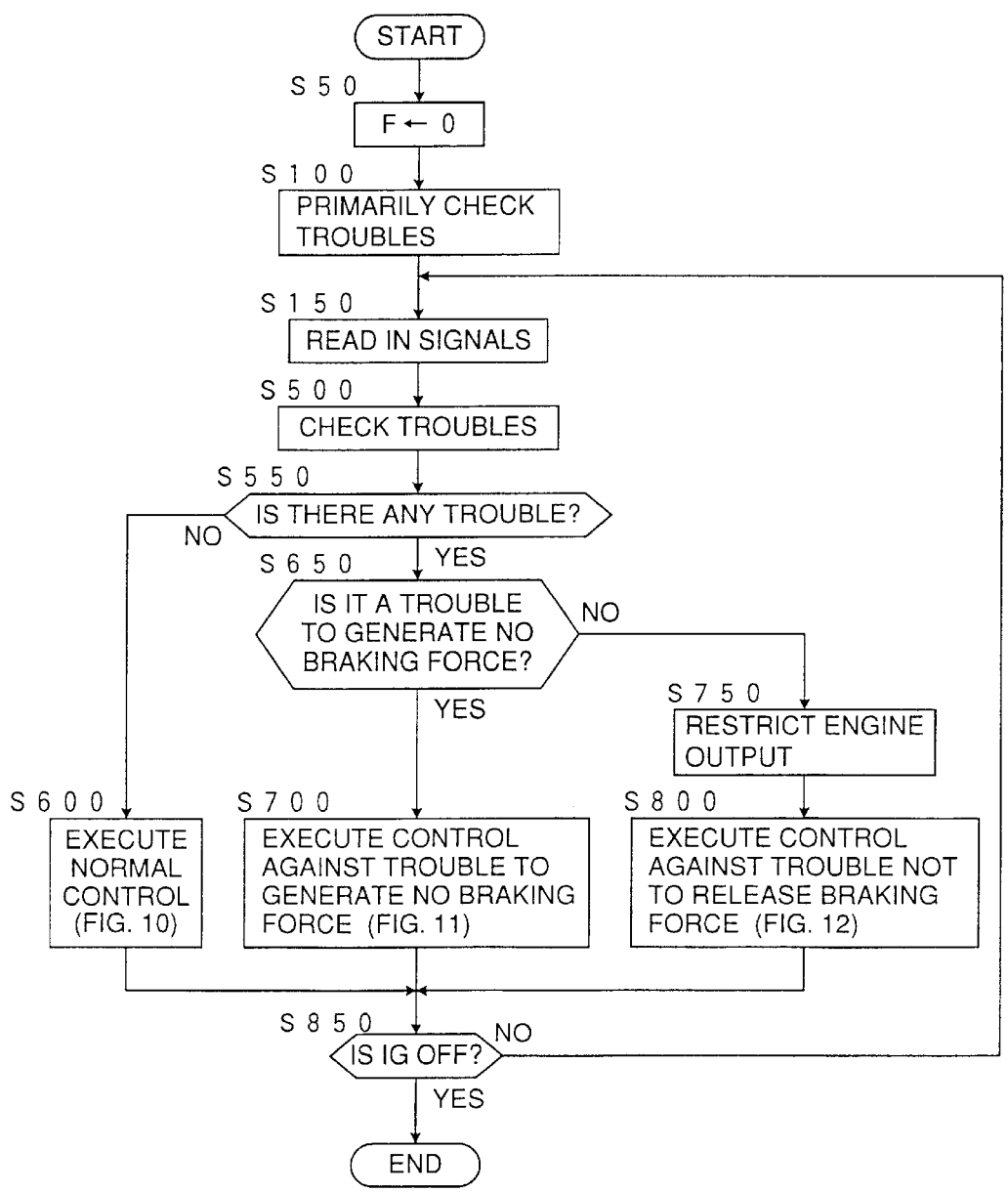
FIG. 9 is a flowchart showing a main routine of the braking force control in the fourth embodiment.

Referring to FIG. 9, the main routine of the braking force control in the fourth embodiment will be described. The control according to the flowchart of FIG. 9 is also started by a closure of an ignition switch not shown in the figure, and is repetitively executed at a predetermined time interval. In FIG. 9, the steps corresponding to those shown in FIG. 2 are designated by the same step numbers.

Steps 50–150 and 850 are executed in the same manner as in those steps of the first embodiment, while in step 500 it is checked if the braking force generation means of the respective wheels went wrong, in the same manner as in step 400 of the first embodiment.

In step 550, it is judged if any of the braking force generation means went wrong. If the answer of judgement is yes, the control proceeds to step 650, whereas if the answer of judgement is no, the control proceeds to step 600, where the braking forces at the respective wheels are controlled according to the depression amount of the brake pedal by the driver according to a normal control sub-routine shown in FIG. 10.

In this connection, when an anti-lock brake control is incorporated such that the braking force is decreased when an excessive slip due to the braking is detected according to wheel speeds Vwi of the respective wheels detected by the wheel speed sensor 48fl–48rr, the anti-lock brake control is stopped when the answer of judgement of step 550 turned into yes. Further, in the case that the vehicle is controlled of its running behavior so as to suppress spinning or drifting out by applying a braking force to a particular wheel when a deterioration of the running behavior was judged based upon longitudinal acceleration Gx and lateral acceleration Gy detected by a longitudinal acceleration sensor and a lateral acceleration sensor not shown in FIG. 8, when the answer of judgement in step 550 turned into yes, such a behavior control is stopped.

Figure 11:
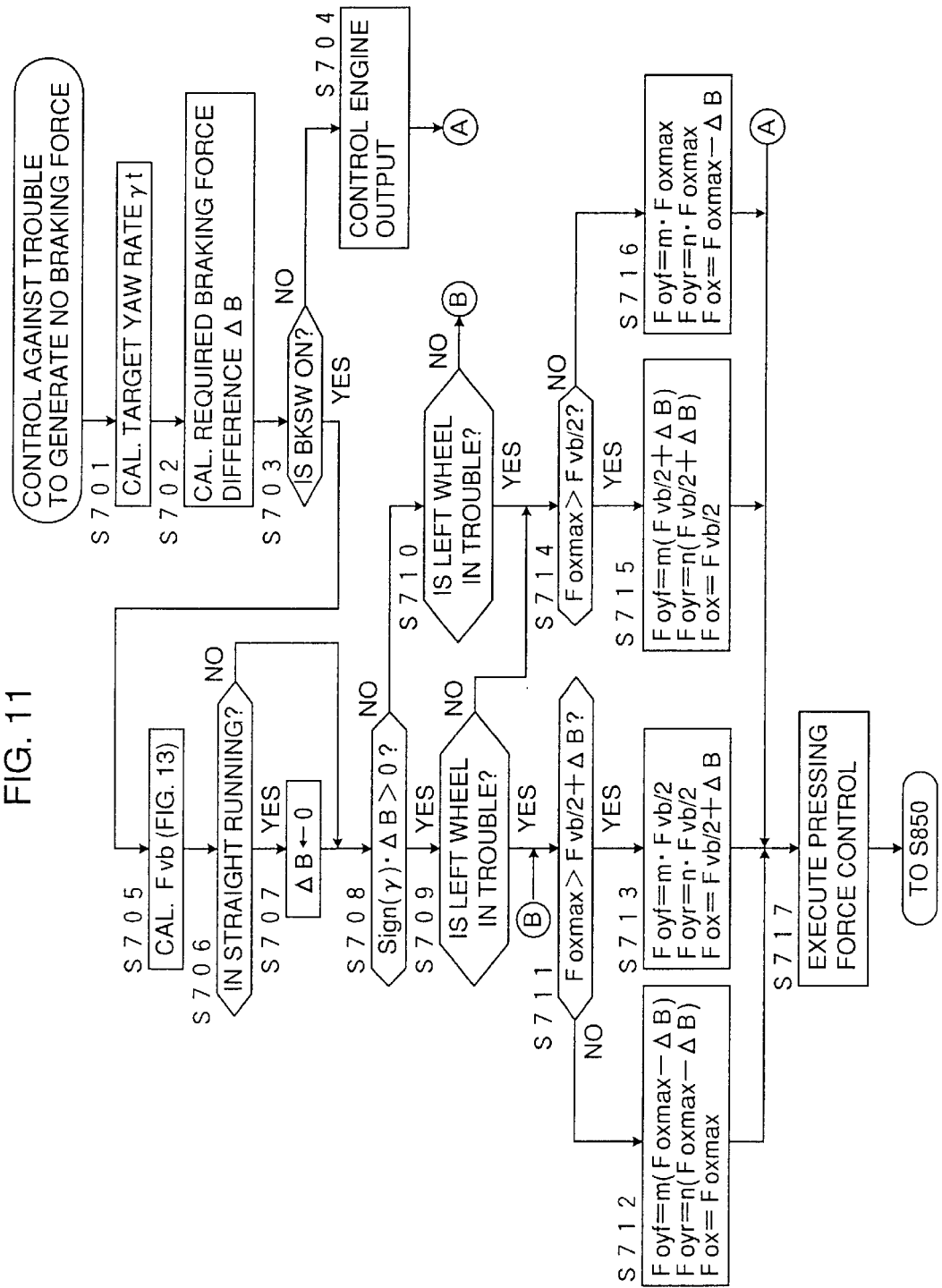
FIG. 11 is a flowchart showing a control routine in a control against trouble not to generate braking force in the fourth embodiment.
Figure 12:
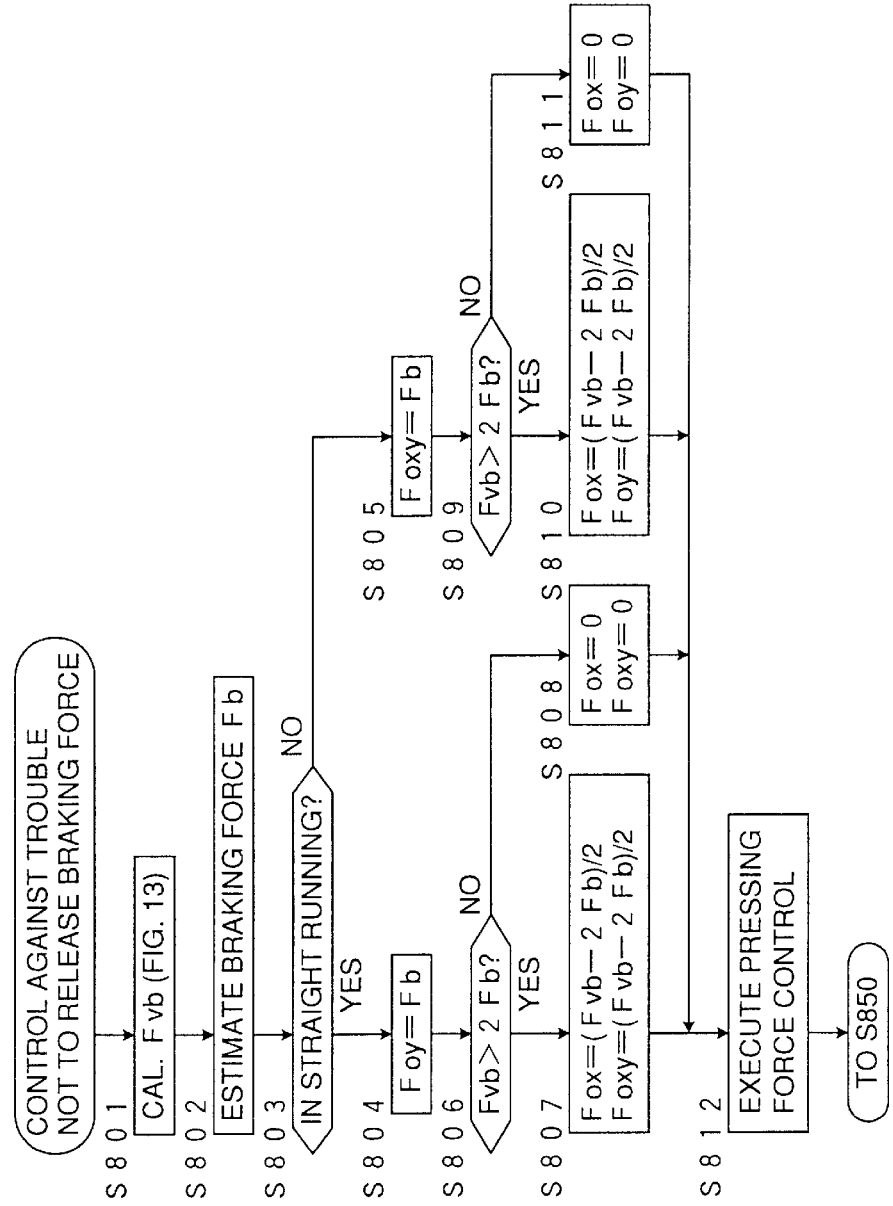
FIG. 12 is a flowchart showing a control routine of a control against trouble not to release braking force in the fourth embodiment.

In step 650, it is judged if the wrong friction force generation means is in a condition unable to generate any braking force, and if the answer of judgement is yes, then in step 700 the braking force generation means other than the wrong one are controlled according to a control routine against trouble to generate no braking force such as shown in FIG. 11, whereas when the answer of judgement is no, then in step 750 the output of the engine is controlled by an adjustment of the throttle opening or a control of the fuel cut so that the vehicle speed V does not exceed a first predetermined value Vc1 (for example, 38 km/h), and then in step 800 the braking force of the front or rear wheel on a side transversely opposite to the wheel at which the braking force generation means went wrong is controlled according to a control routine against trouble not to release braking force such as shown in FIG. 12.

In the engine output control of step 750, when the vehicle speed V at a time point at which the negative judgment was made in step 650 is higher than the first predetermined value Vc1, the vehicle speed is gradually lowered to or below Vc1. The engine output control may be made such that output torque Te or rotation speed Ne of the engine becomes to or below a first predetermined value Tec1 or Nec1, respectively.

Figure 10:
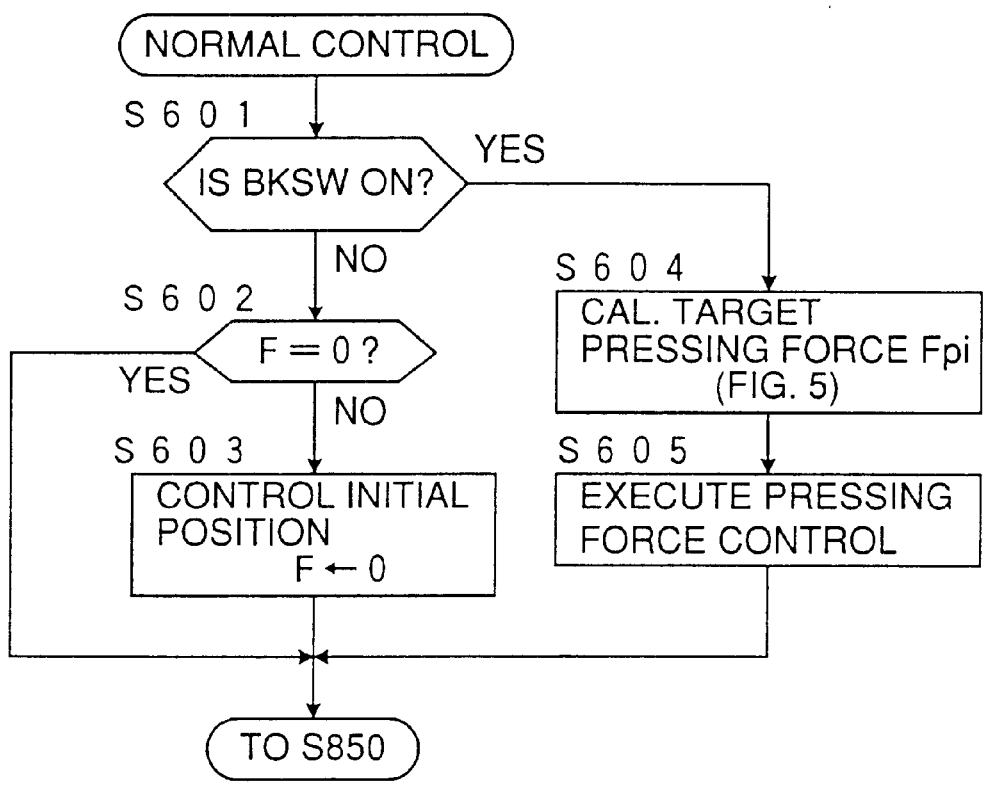
FIG. 10 is a flowchart showing a braking force control routine in a normal operation of the fourth embodiment.

According to the normal control routine shown in FIG. 10, in step 601 it is judged if the brake lamp switch 42 is put on or not, and if the answer of judgement is yes, the control proceeds to step 604, whereas if the answer of judgement is no, the control proceeds to step 602. In step 602, it is judge if flag F is 0 or not, and if the answer of judgement is yes, the control proceeds directly to step 850, whereas if the answer of judgement is no, then in step 603 an initial positioning control for positioning the brake pads of the respective braking force generation means to each initial position is carried out in the same manner as in step 350 of the first embodiment, and flag F is reset to 0.

In step 604, target pressing forces Fpaf and Fpaf for the braking force generation means of the four wheels are calculated according to the depression amount Ab of the brake pedal by referring to the map shown in FIG. 5, and then in step 605 the pressing forces of the respective braking force generation means are controlled to become the respective target pressing forces.

Referring to FIG. 11 showing the control routine against trouble to generate no braking force, in step 701, denoting a stability factor as Kh, the steering gear ratio as Rsg. and the wheel base of the vehicle as H, a standard yaw rate γc is calculated according to the below-mentioned equation 5, and then denoting T and S as a time constant and the Laplace operator, respectively, a target yaw rate γt is calculated according to the below-mentioned equation 6. The standard yaw rate γc may be calculated with an incorporation of lateral acceleration Gy of the vehicle so as to take the dynamic yaw rate into consideration.

$$\gamma c = (V.\ o)/\{(1+Kh.V^2).Rsg.H\} \quad (5)$$

$$\gamma t = \gamma c/(1+T.s) \quad (6)$$

In step 702, a braking force difference ΔB required between the sum of the braking forces by the front and rear left wheels and that by the front and rear right wheels is calculated as a value proportional to the difference between the target yaw rate γt and an actual yaw rate γ, with an appropriate proportioning factor Kb, according to the below-mentioned equation 7.

$$\Delta B = Kb(\gamma t - \gamma) \quad (7)$$

Figure 13:
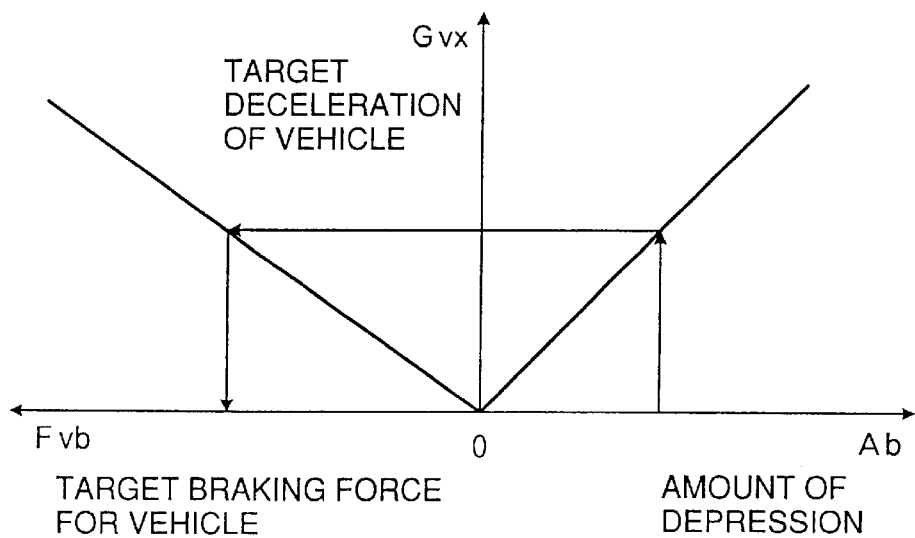
FIG. 13 is a graph showing the relationship among brake pedal depression amount Ab, target vehicle deceleration Gvx and target total vehicle braking force Fvb.

In step 703, it is judged if the brake lamp switch 42 is put on or not in the same manner as in step 601, and if the answer of judgement is no, then in step 704 the engine output is controlled by an adjustment of the throttling valve or the fuel cut so that the vehicle speed V becomes to or below a second predetermined value Vc2 (for example, 40 km/h) larger than Vc1, whereas if the answer of judgment is yes, then in step 705 a target rate of deceleration Gvx for the vehicle is calculated according to the depression Ab of the brake pedal by referring to a map such as shown in FIG. 13, and then a target braking force Fvb totally for the vehicle is calculated.

In the engine output control of step 704, when the vehicle speed V at the time point at which the negative judgement was first made in step 703 is higher than the second predetermined value Vc2, the vehicle speed is gradually lowered to or below Vc2. The engine output control may also be made so that output torque Te or rotation speed Ne of the engine becomes to or below a second predetermined value Tec2 or Nec2, respectively.

In step 706, it is judged if the vehicle is running substantially straight forward according to the steering angle o, and if the answer of judgement is no, the control proceeds to step 708, whereas if the answer is yes, then in step 707 the required braking force difference $\Delta B$ is set to 0, and thereafter the control proceeds to step 708.

In step 708, denoting the sign of the yaw rate $\gamma$ of the vehicle as Sign ($\gamma$), it is judged if the product of Sign ($\gamma$) and the braking force difference $\Delta B$ is positive or not, i.e. if the situation is such that the braking force by the left wheel or wheels is to be made higher than that by the right wheel or wheels in order to decrease the yaw rate difference, and if the answer of judgement is no, the control proceeds to step 710, whereas if the answer of judgement is yes, the control proceeds to step 709.

In step 709, it is judged if the wrong braking force generation means is of a left side wheel (front left wheel or rear left wheel), and when the answer of judgement is yes, the control proceeds to step 711, whereas if the answer of judgement is no, the control proceeds to step 714. Similarly, in step 710, it is judged if the wrong braking force generation means is of a left side wheel or wheels, and if the answer of judgement is yes, the control proceeds to step 714, whereas if the answer of judgement is no, the control proceeds to step 711.

In step 711, it is judged if a maximum braking force Foxmax available by the braking force generation means longitudinally opposite to the wrong braking force generation means is larger than Fvb/2+$\Delta B$, i.e. if there is any allowance for increase with respect to the braking force available by the braking force generation means of the vehicle longitudinally opposite to the vehicle at which the braking force generation means went wrong, and if the answer of judgement is no, the control proceeds to step 712, where target braking forces Foyf and Foyr for the front and rear wheels on a side transversely opposite to the wheel at which the braking force generation means went wrong and a target braking force Fox for the braking force generation means of the wheel longitudinally opposite to the wheel at which the braking force generation means went wrong are respectively calculated according to the below-mentioned equations 8. If the answer of judgement in step 711 is yes, the control proceeds to step 713, where the target braking forces Foyf, Foyr and Fox are respectively calculated according to the below-mentioned equations 9.

In the below-mentioned equations 8 and 9, and further in the below-mentioned equations 10 and 11, factors m and n are values to satisfy such a condition as m+n=1, and more desirably, a further condition such as m>n, such s to be, for example, 0.6 and 0.4, respectively.

$$Foyf=m(Foxmax-\Delta B)$$

$$Foyr=n(Foxmax-\Delta B)$$

$$Fox=Fomax \quad (8)$$

$$Foyf=m.Fvb/2$$

$$Foyr=n.Fvb/2$$

$$Fox=Fbv/2+\Delta B \quad (9)$$

In step 714, it is judged if a maximum braking force Foxmax available by the braking force generation means of the wheel longitudinally opposite to the wheel at which the braking force generation means went wrong is larger than Fbv/2, i.e. if there is an allowance for increase of the braking force available by the braking force generation means of the wheel longitudinally opposite to the wheel at which the braking force generation means went wrong, and if the answer of judgement is yes, the control proceeds to step 715, where the target braking forces Foyf, Foyr and Fox are calculated according to the below-mentioned equations 10, whereas if the answer of judgement is no, the control proceeds to step 716, where the respective target braking forces are calculated according to the below-mentioned equations 11.

$$Foyf=m(Fvb/2+\Delta B)$$

$$Foyr=n(Fvb/2+\Delta B)$$

$$Fox=Fvb/2 \quad (10)$$

$$Foyf=m.Foxmax$$

$$Foyr=n.Foxmax$$

$$Fox=Foxmax-\Delta B \quad (11)$$

In step 717, the pressing forces of the braking force generation means other than the wrong braking force generation means are controlled so that the braking forces at the wheels other than the wheel at which the braking force generation means went wrong become the target braking forces Foyf, Foyr and Fox, respectively, calculated in step 712, 713, 715 or 716.

The maximum braking force Foxmax available by the braking force generation means of the wheel longitudinally opposite to the wheel at which the braking force generation means went wrong may be, for example, the braking force at the wheel at which an anti-lock brake control is started, or may be a value determined beforehand by experiments. Particularly when the maximum braking force is determined by experiments, the value of the maximum braking force may be increased or decreased according to the shifting of the load in the vehicle body estimated according to the longitudinal acceleration Gx or the lateral acceleration Gy of the vehicle.

In the control routine against trouble not to release the braking force shown in FIG. 12, in step 801 a target braking force Fvb for the vehicle as a whole is calculated in the same manner as in step 705, and then in step 802 the braking force Fb generated and maintained by the wrong braking force generation means is estimated according to the pressing force Fpi detected by the corresponding load sensor 28.

In step 803, it is judged if the vehicle is running substantially straight forward according to the steering angle o, and if the answer of judgement is yes, then in step 804 the target braking force Foy for the wheel transversely opposite to the wheel at which the braking force generation means went wrong is set to the braking force Fb generated and maintained by the wrong braking force generation means, whereas if the answer of judgement is no, then in step 805 the target braking force Foxy for the wheel diagonally opposite to the wheel at which the braking force generation means went wrong is set to the braking force Fb generated and maintained by the wrong braking force generation means.

In step 806, it is checked if the target braking force Fvb for the vehicle as a whole is larger than 2Fb, i.e. if it is necessary to apply a braking to other wheels, and if the answer of judgement is yes, then in step 807 the target braking force Fox for the wheel longitudinally opposite to the wheel at which the braking force generation means went wrong and the target braking force Foxy for the wheel diagonally opposite to the vehicle at which the braking force generation means went wrong are calculated according to the below-mentioned equations 12, whereas if the answer of judgement is no, then in step 808 the target braking forces Fox and Foxy are set to 0.

$$Fox = (Fvb - 2Fb)/2$$
$$Foxy = (Fvb - 2Fb)/2 \qquad (12)$$

In step 809, the same judgement as in step 806 is carried out, and if the answer of judgement is yes, then in step 810 the target braking force Fox for the wheel longitudinally opposite to the wheel at which the braking force generation means went wrong and the target braking force Foy for the wheel transversely opposite to the wheel at which the braking force generation means went wrong are calculated according to the below-mentioned equations 13, whereas if the answer of judgement is no, then in step 811 the target braking forces Fox and Foy are set to 0.

$$Fox = (Fvb - 2Fb)/2$$
$$Foy = (Fvb - 2Fb)/2 \qquad (13)$$

In step 812, the pressing forces of the braking force generation means of the respective wheels are controlled so that the braking forces of the wheels other than the wheel at which the braking force generation means went wrong become the target braking forces Foy, Fox and Foxy, respectively, set in step 807, 808, 810 or 811, in the same manner as in step 717.

Thus, according to this fourth embodiment, in step 500 a trouble check is carried out about the braking force generation means of the respective wheels and in step 550 it is judged if any of the braking force generation means went wrong. If all of the braking force generation means are normal, the answer of judgement in step 550 is no, and then in step 600 the braking forces of the respective wheels are controlled in response to the depression amount of the brake pedal by the driver according to the normal control subroutine shown in FIG. 10.

In contrast, if either of the braking force generation means went wrong to generate no braking force, the answer of judgement in step 650 is yes, and then in step 700 the braking force generation means of the wheels other than the wheel at which the braking force generation means went wrong are controlled according to the control routine against trouble to generate no braking force shown in FIG. 11, so that the normal braking force generation means are controlled to make the yaw rate of the vehicle to coincide with the target yaw rate.

Therefore, even when either of the braking force generation means went wrong to generate no braking force, a deterioration of the vehicle behavior due to an unbalanced braking during a braked running of the vehicle is prevented, while minimizing a lowering of the braking force as compared with the first embodiment according to which the braking force generation means of the wheel transversely opposite to the wheel at which the braking force generation means went wrong is made inoperative, while the turning performance of the vehicle is improved as compared with the second and third embodiments according to which the normal braking force generation means are controlled so that the sum of the braking forces at the front and rear left wheels and the sum of the braking forces at the front and rear right wheels are made to be equal to one another.

Particularly according to the shown embodiment, in steps 711 and 714 it is judged if there is an allowance for increase of the braking force available by the braking force generation means of the wheels longitudinally opposite to the wheel at which the braking force generation means went wrong, and when the answer of judgement is yes, in step 713 or 715 the target braking forces for the normal braking force generation means are set according to the depression amount of the brake pedal, while ensuing a required braking force difference ΔB, whereas when the answer of judgement is no, in step 712 or 716 the braking force is set according to the depression amount of the brake pedal, while ensuring the braking force difference ΔB, to be as close to the necessary amount as possible, and therefore, it is possible to lower a liability to a brake locking due to an over-braking of the wheel positioned longitudinally opposite to the wheel at which the braking force generation means went wrong, as compared in the case that the target braking force for the normal wheels are always set according to step 713 or 715 with no judgement by steps 711 and 714.

Further, where either one of the braking force generation means went wrong not to release the braking force generated thereby, the answer of judgement in step 650 becomes no, and then in step 750 the engine output is controlled so that the vehicle speed V is equal to or below the predetermined value Vc1, and further in step 800 the braking of the front or rear wheel on a side transversely opposite to the side of the wheel at which the braking force generation means went wrong according to the control routine against trouble not to release braking force shown in FIG. 12, so that thereby it is avoided that an excessive yaw moment is applied to the vehicle.

Therefore, even when either one of the braking force generation means went abruptly wrong not to release the braking force during a running of the vehicle, it is avoided that the output of the engine is uselessly consumed, and further it is definitely avoided that the vehicle abruptly spins or drifts out due to a needless moment being applied to the vehicle, thereby enabling the vehicle to be safely stopped.

Particularly according to the shown embodiment in step 803 it is judged if the vehicle is running substantially straight forward, and when it is so, in step 804 the target braking force Foy for the wheel transversely opposite to the wheel at which the braking force generation means went wrong is set to the braking force Fb generated by the wrong braking force generation means, and when the vehicle is making a turn, in step 805 the target braking force Foxy for the wheel diagonally opposite to the wheel at which the braking force generation means went wrong is set to the braking force Fb by the wrong braking force generation means, so that thereby it is effectively avoided that a needless yaw moment is applied to the vehicle during its straight forward running, thereby effectively lowering a liability of the vehicle to spin or drift-out due to an insufficiency of the transverse forces of the left and right wheels including the wheel at which the braking force generation means went wrong during a turn running of the vehicle.

Although the present invention has been described in detail with respect to some particular embodiments thereof, it will be apparent for those skilled in the art that other various embodiments are possible within the scope of the present invention.

For example, in the above-mentioned respective embodiments, although the braking force generation means are of an electric type, and the actuators thereof are of an ultrasonic motor type, any known braking force generation means may be used as long as they can generate the braking force according to the depression of the brake pedal for each wheel independently of others.

Further, although in the above-mentioned first through third embodiments the engine output is not restricted when either one of the braking force generation means went wrong, the engine output may be restricted even when either one of the braking forces went wrong.

Further, although in the above-mentioned second and third embodiments, when either one of the electric brake means went wrong, the other three electric brake means are controlled so that the sum of the braking forces generated by the front and rear electric braking forces on one side of the vehicle becomes equal to the sum of the braking forces generated by the electric brake means on the other side of the vehicle, if some state amount sensors are provided for the respective braking force generation means as in the shown embodiments, since the braking force generated by certain one of the electric brake means can be known even when the certain electric means went wrong, the second and third embodiments may be constructed such that the braking forces generated by the three braking force generation means other than the wrong braking force generation means generate the same sum of braking forces for the left and right sides of the vehicle.

Further, although in the above-mentioned second and third embodiments, when the electric brake means of the front left or front right wheel or the rear left or rear right wheel went wrong, the target braking forces for the front or rear wheel transversely opposite to the wheel at which the electric brake means went wrong is calculated according to the above-mentioned equations 1 and 2 or 3 and 4, those pressing forces of the wheels may be calculated according to the below-mentioned equations 14–17, by taking distribution ratios K1 and K2 for the front wheel as positive constants each being, for example between 0.5 and 1, as follows:

$$Fpaft = Fpar.K1 \tag{14}$$

$$Fpart = Fpar.(1-K1) \tag{15}$$

$$Fpart = Fpaf.K2 \tag{16}$$

$$Fpart = Fpaf.(1-K2) \tag{17}$$

Figure 14:
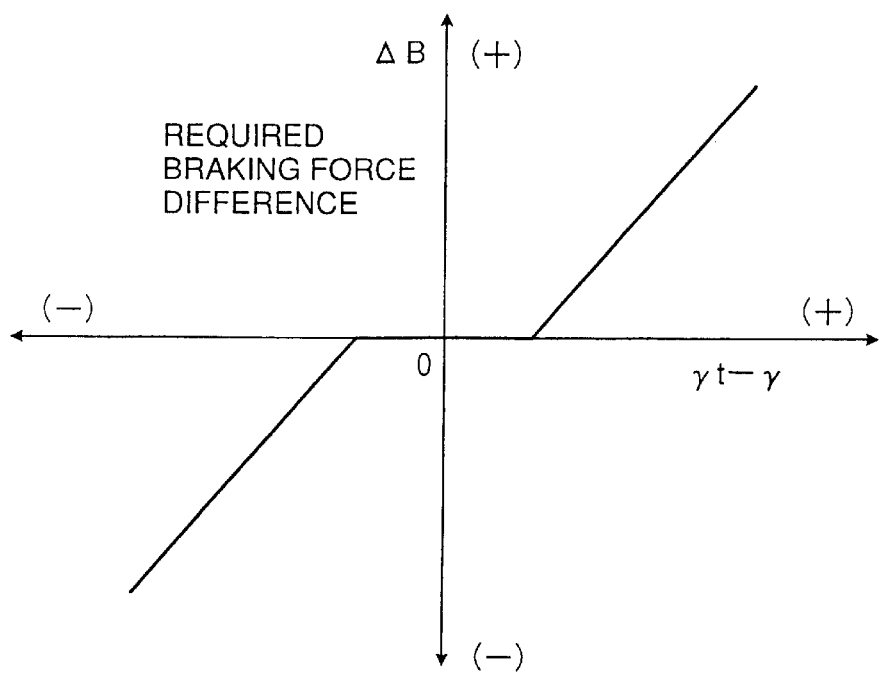
FIG. 14 is a graph showing the relationship between yaw rate deviation γt−γ and a required braking force difference ΔB.

Further, in the above-mentioned fourth embodiment, when it was judged in step 706 that the vehicle is running substantially straight forward, in step 707 the required braking force difference ΔB is set to 0. However, for example, in step 702 the required braking force difference ΔB may be calculated by referring to the map shown in FIG. 14, thereby omitting steps 706 and 707.

Further, in the above-mentioned fourth embodiment, when either one of the braking force generation means went wrong not to release the braking force, the front or rear wheel transversely opposite to the wheel at which the braking force went wrong is applied with the braking force substantially equal to the braking force applied by the wrong braking force generation means, so as to prevent an instable condition of the vehicle such as a spinning or a drifting-out. However, the braking forces of the normal wheels may be controlled so that the yaw rate γ of the vehicle becomes the target yaw rate γt in the same manner as in the case that either one of the braking force generation means went wrong not to release the braking force.

In this case, taking Ka as a positive factor or a negative factor according to whether the wheel at which the braking force generation means went wrong is a left wheel or a right wheel, respectively, the required braking force difference ΔB may be calculated according to the below-mentioned equation 18, and in step 707 ΔB may be set to Ka.Fb.

$$\Delta B = Kb(\gamma t - \gamma) + Ka.Fb \tag{18}$$

Although the present invention has been described with respect to several preferred embodiments thereof, it will be apparent for those skilled in the art that other various embodiments are possible without departing the spirit of the present invention.

What is claimed is:

1. A brake system for vehicles, comprising braking force generation means each provided for each of wheels to generate a braking force individually in each wheel according to an amount of depression of a brake pedal, and control means for controlling each of the braking force generation means for each of the wheels independently of the other braking force generation means for the other wheels, wherein when any one of the braking force generation means malfunctions not to substantially release a generated braking force, the control means operates one of the braking force generation means positioned transversely opposite to the malfunctioning braking force generation means according to the magnitude of the unreleased braking force so as to generate a braking force that prevents a needless yaw moment from being applied to the vehicle.

2. A brake system for vehicles, comprising braking force generation means each provided for each of wheels to generate a braking force individually in each wheel according to an amount of depression of a brake pedal, and control means for controlling each of the braking force generation means for each of the wheels independently of the other braking force generation means for the other wheels, wherein the control means comprises means for calculating a target yaw moment for the vehicle according to a running condition of the vehicle, and when any one of the braking force generation means malfunctions, the control means operates other three normal braking force generationmeans, so that the yaw moment of the vehicle substantially coincides with the target yaw moment.

3. A brake system for vehicles, comprising braking force generation means each provided for each of wheels to generate a braking force individually in each wheel according to an amount of depression of a brake pedal, and control means for controlling each of the braking force generation means for each of the wheels independently of the other braking force generation means for the other wheels, wherein when any one of the braking force generation means malfunctions to generate substantially no braking force, the control means operates other normal ones of the braking force generation means including a braking force generation means transversely opposite to the malfunctioning braking force generation means, so that the braking force generated by one of the braking force generation means positioned longitudinally opposite to the malfunctioning braking force generation means substantially coincides with the sum of the braking forces generated by front and rear ones of the braking force generation means positioned on a side transversely opposite to the malfunctioning braking force generation means.

4. A brake system for vehicles, comprising braking force generation means each provided for each of wheels to generate a braking force individually in each wheel according to an amount of depression of a brake pedal, and control means for controlling each of the braking force generation means for each of the wheels independently of the other braking force generation means for the other wheels, wherein the vehicle has an engine for generating a kinetic energy for the vehicle to run, and when any one of the braking force generation means malfunctions not to substantially release a generated braking force, the control means operates one of the braking force generation means positioned transversely opposite to the malfunctioning braking force generation means to generate a braking force the prevents a needless yaw moment from being applied to the vehicle, while the control means restricts the generation of the kinetic energy by the engine.

5. A brake system for vehicles according to claim 4, wherein the braking force generation means includes an electric motor as an actuator.

6. A brake system for vehicles, comprising braking force generation means each provided for each of wheels to generate a braking force individually in each wheel according to an amount of depression of a brake pedal, and control means for controlling each of the braking force generation means for each of the wheels independently of the other braking force generation means for the other wheels, wherein when any one of the braking force generation means malfunctions, the control means modifies the braking forces generated by normal ones of the braking force generation means so that the modified braking forces cancel the yaw moment which would otherwise be applied to the vehicle by the malfunctioning braking force generation means and the normal braking force generation means according to the depression of the brake pedal.

7. A brake system for vehicles according to claim 6, wherein the vehicle has an engine for generating a kinetic energy for the vehicle to run, and when any one of the braking force generation means malfunctions, the control means decreases the generation of the kinetic energy by the engine.

8. A brake system for vehicles, comprising braking force generation means each provided for each of wheels to generate a braking force individually in each wheel according to an amount of depression of a brake pedal, and control means for controlling each of the braking force generation means for each of the wheels independently of the other braking force generation means for the other wheels, wherein when any one of the braking force generation means malfunctions, the control means controls the normal braking force generation means so as to prevent a needless yaw moment from being applied to the vehicle, and wherein it is judged if there is any allowance for increase in the braking force available by one of the braking force generation means positioned longitudinally opposite to the malfunctioning braking force generation means, and when there is no allowance in the available braking force, the target braking force for one of the braking force generation means positioned longitudinally opposite to the malfunctioning braking force generation means is set to the available braking force, so that the target braking forces for other wheels are set according to the available braking force.

9. A brake system for vehicles, comprising braking force generation means each provided for each of wheels to generate a braking force individually in each wheel according to an amount of depression of a brake pedal, and control means for controlling each of the braking force generation means for each of the wheels independently of the other braking force generation means for the other wheels, wherein when any one of the braking force generation means malfunctions, the control means controls the normal braking force generation means so as to prevent a needless yaw moment from being applied to the vehicle, and wherein when any one of the braking force generation means malfunctions not to substantially release a generated braking force, when the vehicle is running straight forward, the target braking force of one of the braking force generation means positioned transversely opposite to the malfunctioning braking force generation means is set to be substantially equal to the braking force generated by the malfunctioning braking force generation means, while when the vehicle is substantially turning, the target braking force of one of the braking force generation means positioned diagonally opposite to the malfunctioning braking force generation means is set to be substantially equal to the braking force generated by the malfunctioning braking force generation means.

10. A brake system for vehicles, comprising brake force generation means each provided for each of wheels to generate a braking force individually in each wheel according to an amount of depression of a brake pedal, and control means for controlling each of the braking force generation means for each of the wheels independently of the other braking force generation means for the other wheels, wherein when any one of the braking force generation means malfunctions, the control means controls the normal braking force generation means so as to prevent a needless yaw moment from being applied to the vehicle, and wherein the control means is constructed to calculate the target braking force of one of the braking force generation means positioned longitudinally opposite to the malfunctioning braking force generation means according to an amount of depression of the braking pedal, and to calculate the target braking forces of front and rear ones of the braking force generation means on a side transversely opposite to the side of the malfunctioning braking force generation means so that the sum thereof is substantially equal to the target braking force of the above-mentioned one braking force generation means, so as thereby to control the braking forces of all of the braking force generation means, except the malfunctioning braking force generation means, to correspond to the target braking forces respectively corresponding thereto.

* * * * *

UNITED STATES PATENT AND TRADEMARK OFFICE
CERTIFICATE OF CORRECTION

PATENT NO.     : 6,412,885 B1           Page 1 of 1
DATED          : July 2, 2002
INVENTOR(S)    : Kenji Shirai et al.

It is certified that error appears in the above-identified patent and that said Letters Patent is hereby corrected as shown below:

Column 14,
Line 54, change "$\gamma c=(V.0)/\{(1+Kh.V^2).Rsg.H\}$" to -- $\gamma c=(V\cdot 0)/\{(1+Kh\cdot V^2)\cdot Rsg\cdot H\}$ --
Line 55, change "$(1+T.s)$" to -- $(1+T\cdot s)$ --.

Column 16,
Line 6, change "$Foyf=m.Fvb/2$" to -- $Foyf=m\cdot Fvb/2$ --.
Line 8, change "$Foyr=n.Fvb/2$" to -- $Foyr=n\cdot Fvb/2$ --.
Line 32, change "$Foyf=m.Foxmax$" to -- $Foyf=m\cdot Foxmax$ --.
Line 34, change "$Foyr=n.Foxmax$" to -- $Foyr=n\cdot Foxmax$ --.

Column 19,
Line 51, change "$Fpaft=Fpar.K1$" to -- $Fpaft=Fpar\cdot K1$ --.
Line 52, change "$Fpart=Fpar.(1-K1)$" to -- $Fpart=Fpar\cdot(1-K1)$ --.
Line 54, change "$Fpart=Fpaf.K2$" to -- $Fpart=Fpaf\cdot K2$ --.
Line 56, change "$Fpart=Fpaf.(1-K2)$" to -- $Fpart=Fpaf\cdot(1-K2)$ --.

Column 20,
Line 15, change "$Ka.Fb.$" to -- $Ka\cdot Fb.$ --.
Line 16, change "$_{Ka.Fb}$" to -- $_{Ka\cdot Fb}$ --.
Line 50, change "generationmeans" to -- generation means --.

Signed and Sealed this

Twenty-fifth Day of March, 2003

JAMES E. ROGAN
*Director of the United States Patent and Trademark Office*